United States Patent [19]

Itabashi

[11] Patent Number: 5,136,418
[45] Date of Patent: Aug. 4, 1992

[54] Fθ LENS SYSTEM IN OPTICAL SCANNER

[75] Inventor: Akihisa Itabashi, Mitaka, Japan

[73] Assignee: Ricoh Company, Ltd., Tokyo, Japan

[21] Appl. No.: 629,607

[22] Filed: Dec. 18, 1990

[30] Foreign Application Priority Data

Feb. 14, 1990 [JP] Japan ................................. 2-33088

[51] Int. Cl.$^5$ ............................................. G02B 26/10
[52] U.S. Cl. ..................................... 359/218; 359/216; 359/793
[58] Field of Search ............... 359/218, 216, 793, 212, 359/217, 219; 346/76 L

[56] References Cited

U.S. PATENT DOCUMENTS

| | | | |
|---|---|---|---|
| 4,715,699 | 12/1987 | Morimoto | 359/218 |
| 4,919,502 | 4/1990 | Yamakawa | 359/218 |
| 5,009,472 | 4/1991 | Morimoto | 359/212 |

Primary Examiner—Loha Ben
Attorney, Agent, or Firm—Fish & Richardson

[57] ABSTRACT

In an fθ lens system in an optical scanner, an approximately parallel light beam from a light source device is formed as a linear image extending in a main scan-corresponding direction and is deflected at an equal angular velocity by a rotary polygon mirror having a reflecting face in the vicinity of the position of the formed linear image. The deflected light beam is formed by an image forming lens system as an image in the shape of a spot on a scanned face to optically scan the scanned face at an approximately equal speed. The image forming lens system forms the light beam deflected by the rotary polygon mirror as an image on the scanned face. The fθ lens system has a function for setting a reflecting position of the rotary polygon mirror and the scanned face in an approximately conjugate relation in geometrical optics with respect to a cross scanning direction, and an fθ function with respect to a main scanning direction. The fθ lens system further has two groups of first and second lenses sequentially arranged from the rotary polygon mirror toward the scanned face. The lenses have first to fourth lens faces which are counted from the side of the rotary polygon mirror and respectively have shapes of a straight line, an arc, a straight line and an arc on the deflecting plane sequentially from the first lens face toward the fourth lens face.

8 Claims, 12 Drawing Sheets

——— SPHERICAL ABERRATION
- - - - SINE CONDITION

FIELD CURVATURE    fθ CHARACTERISTICS(%)

—— SPHERICAL ABERRATION
----- SINE CONDITION

Fig.12b

$\theta = 31.7°$

−0.01f$_M$ 0.01f$_M$ $\theta = -31.7°$

FIELD CURVATURE

Fig.12c $\theta = 31.7°$

−0.50 0 0.50 f$\theta$ CHARACTERISTICS(%)

Fig.14a $F_{NO}=54.7$ $-0.0005f_M$ 0 $0.0005f$

——— SPHERICAL ABERRATION
----- SINE CONDITION

Fig.14b $\theta=31.8°$ $-0.01f_M$ $0.01f_M$ $\theta=-31.8°$

FIELD CURVATURE

Fig.14c $\theta=31.8°$ $-0.50$ 0 $0.50$ $f\theta$ CHARACTERISTICS(%)

——— SPHERICAL ABERRATION
- - - - SINE CONDITION

Fig. 15b $\theta = 31.8°$

-0.01fM   0.01fM $\theta = -31.8°$

FIELD CURVATURE

Fig. 15c $\theta = 31.8°$

-0.50  0  0.50

$f\theta$ CHARACTERISTICS(%)

Fig.16a Fig.16b Fig.16c

Fθ LENS SYSTEM IN OPTICAL SCANNER

BACKGROUND OF THE INVENTION

1. Field of the Invention

The present invention relates to an f θ lens system in an optical scanner using a rotary polygon mirror.

2. Description of the Related Art

An optical scanner is known as a device for writing and reading information by performing an optical scanning operation of a light beam and is used in a laser printer, a facsimile, etc.

In such an optical scanner, there is a device of a system in which an approximately parallel light beam from a light source device is formed as a linear image extending in a main scan-corresponding direction and is deflected at an equal angular velocity by a rotary polygon mirror having a reflecting face in the vicinity of the position of the formed linear image. In this system, the deflected light beam is formed as an image in the shape of a spot on a scanned face by an image forming lens system to scan the scanned face.

In the optical scanner using the rotary polygon mirror, there is a problem about a so-called reflecting face inclination. Further, since the angular velocity of the rotary polygon mirror is constant, no scanned face is scanned by the deflected light beam at an equal speed when a normal f·tan θ lens is used. Accordingly, it is necessary to dispose a means for performing the optical scanning operation at an equal speed. The f θ lens system is a lens system for performing the optical scanning operation at a constant speed with respect to this scanned face. This lens system has an f θ function constructed such that the height of an image formed by the light beam having an incident angle θ with respect to a lens optical axis is set to f θ when a focal length of the lens system is f.

As a method for solving the problem about the reflecting face inclination, there is a method in which a lens system disposed between the rotary polygon mirror and the scanned face is set to an anamorphic system and the scanned face and a light reflecting position of the rotary polygon mirror are set in a conjugate relation in geometrical optics with respect to a cross scanning direction.

There are various kinds of lens systems in which the f θ lens system is set to an anamorphic system to solve the problems about the optical scanning operation at a constant speed and the reflecting face inclination. For example, Japanese Patent Application Laying Open (KOKAI) No. 63-19617 shows an f θ lens system having two lenses.

However, in this f θ lens system, field curvature is not necessarily corrected sufficiently and the diameter of an image spot formed on the scanned face is considerably changed in accordance with a scanning position so that it is difficult to perform the optical scanning operation of high density. Japanese Patent Application Laying Open (KOKAI) No. 61-120112 shows an f θ lens system having two lenses and using a so-called saddle type toric face to preferably correct field curvature. However, in this f θ lens system, two aspherical lens faces are used so that it is difficult to process the lenses.

SUMMARY OF THE INVENTION

It is therefore an object of the present invention to provide a novel f θ lens system for sufficiently correcting field curvatures in main and cross scanning directions and solving the problems about the reflecting face inclination in a rotary polygon mirror.

The above object of the present invention can be achieved by an f θ lens system in an optical scanner in which an approximately parallel light beam from a light source device is formed as a linear image extending in a main scan-corresponding direction and is deflected at an equal angular velocity by a rotary polygon mirror having a reflecting face in the vicinity of the position of the formed linear image and the deflected light beam is formed by an image forming lens system as an image in the shape of a spot on a scanned face to optically scan the scanned face at an approximately equal speed. The image forming lens system forms the light beam deflected by the rotary polygon mirror as an image on the scanned face. The f θ lens system comprises functional means having a function for setting a reflecting position of the rotary polygon mirror and the scanned face in an approximately conjugate relation in geometrical optics with respect to a cross scanning direction, the functional means having an f θ function with respect to a main scanning direction; and two groups of first and second lenses sequentially arranged from the side of the rotary polygon mirror toward the scanned face side. A deflecting plane is constructed by a plane provided by moving a main light beam ideally deflected by the rotary polygon mirror in accordance with the deflection of the main light beam. A deflecting perpendicular plane is constructed by a plane parallel to an optical axis of an image forming optical system and perpendicular to the deflecting plane. The lenses have first to fourth lens faces which are counted from the side of the rotary polygon mirror and respectively have shapes of a straight line, an arc, a straight line and an arc on the deflecting plane sequentially from the first lens face toward the fourth lens face. The first and second lenses respectively have negative and positive refracting powers on a plane parallel to the deflecting plane. The first lens face is constructed by a convex or concave cylindrical face having refracting power only on the deflecting perpendicular plane. The second lens face is constructed by a concave barrel type toric face having a radius of curvature on the deflecting perpendicular plane decreased as this toric face is separated from the optical axis. The third lens face is constructed by a concave cylindrical face having refracting power only on the deflecting perpendicular plane. The fourth lens face is constructed by a convex toric face having large curvature on the deflecting perpendicular plane.

In accordance with the above structure, field curvatures in main and cross scanning directions are sufficiently corrected and the problems about the reflecting face inclination in the rotary polygon mirror are solved.

Further objects and advantages of the present invention will be apparent from the following description of the preferred embodiments of the present invention as illustrated in the accompanying drawings.

DESCRIPTION OF THE PREFERRED EMBODIMENTS

The preferred embodiments of an f θ lens system in an optical scanner in the present invention will next be described in detail with reference to the accompanying drawings.

In an f θ lens system in an optical scanner of the present invention, an approximately parallel light beam from a light source device is formed as a linear image extending in a main scan-corresponding direction and is deflected at an equal angular velocity by a rotary polygon mirror having a reflecting face in the vicinity of the position of the formed linear image. The deflected light beam is formed by an image forming lens system as an image in the shape of a spot on a scanned face to optically scan the scanned face at an approximately equal speed. The image forming lens system forms the light beam deflected by the rotary polygon mirror as an image on the scanned face. The f θ lens system has a function for setting a reflecting position of the rotary polygon mirror and the scanned face in an approximately conjugate relation in geometrical optics with respect to a cross scanning direction, and an f θ function with respect to a main scanning direction.

In this f θ lens system, two groups of first and second lenses are sequentially arranged from the side of the rotary polygon mirror toward the scanned face side. The lenses have first to fourth lens faces which are counted from the side of the rotary polygon mirror and respectively have shapes of a straight line, an arc, a straight line and an arc on a deflecting plane sequentially from the first lens face toward the fourth lens face. First and second lenses respectively have negative and positive refracting powers on a plane parallel to the deflecting plane.

The first lens face is constructed by a convex or concave cylindrical face having refracting power only on a deflecting perpendicular plane. The second lens face is constructed by a concave barrel type toric face having a radius of curvature on the deflecting perpendicular plane decreased as this toric face is separated from an optical axis. The third lens face is constructed by a concave cylindrical face having refracting power only on the deflecting perpendicular plane. The fourth lens face is constructed by a convex toric face having large curvature on the deflecting perpendicular plane.

In the above description, the "deflecting plane" is a plane formed by moving a main light beam ideally deflected by the rotary polygon mirror. The "deflecting perpendicular plane" is a plane parallel to an optical axis of the f θ lens system and perpendicular to the above deflecting plane.

A combined focal length $f_S$ of the lens system on the deflecting perpendicular plane and radii $r'_1$ and $r'_2$ of curvature of the first and second lens faces on the deflecting perpendicular plane including the optical axis satisfy the following condition.

$$0.3 < |\{(1/r'_1) - (1/r'_2)\} + \{(1/r'_3) - (1/r'_4)\} \cdot f_S| < 44 \quad (I)$$

The respective lens faces of the f θ lens system of the present invention will next be described with reference to FIG. 1.

Figure 1:
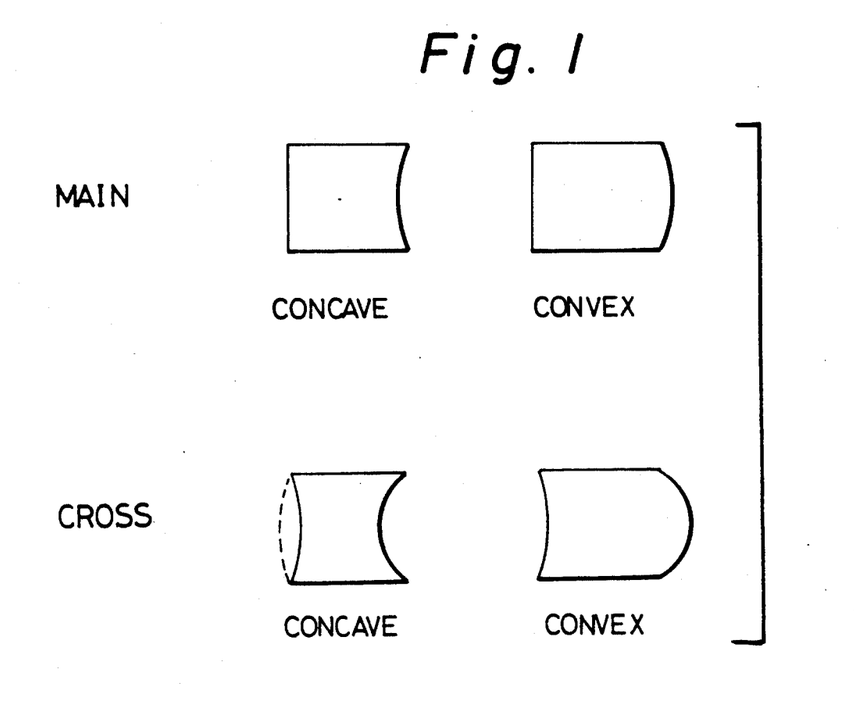
FIG. 1 is a view for explaining the shape of an f θ lens system in the present invention.

In FIG. 1, the left-hand side is a side of the rotary polygon mirror and the right-hand side is a side of the scanned face. Accordingly, first and second lenses are respectively arranged on the left-hand and right-hand sides in FIG. 1. First to fourth lens faces are sequentially arranged from left toward right.

The upper views in FIG. 1 show lens shapes of the f θ lens system on the deflecting plane and the lower views in FIG. 1 show lens shapes of the f θ lens system on the deflecting perpendicular plane including the optical axis.

The deflecting plane corresponds to an ideal main scanning direction with respect to an intersection line between the deflecting plane and the scanned face. Therefore, the respective upper views in FIG. 1 are shown as "main". Similarly, the deflecting perpendicular plane corresponds to a cross scanning direction. Therefore, the respective lower views in FIG. 1 are shown as "cross".

As shown in the respective upper views in FIG. 1, the first to fourth lens faces on the deflecting plane sequentially have shapes of a straight line, an arc, a straight line and an arc. The first and second lenses respectively have negative and positive refracting powers on a plane parallel to the deflecting plane. The respective views in FIG. 1 also show that lens functions on the deflecting plane and the deflecting perpendicular plane are a "convex" or "concave" lens function.

The above condition (I) will next be explained.

It is possible to preferably correct field curvatures in the main and cross scanning directions by the above lens face construction of the f θ lens system.

However, it is necessary to further satisfy the above condition (I) to effectively correct the field curvature in the cross scanning direction in a state in which the field curvature in the main scanning direction is preferably corrected. Namely, when the reflecting face inclination is corrected by the above lens face construction and the absolute value in the condition (I) exceeds a lower limit thereof, the field curvature in the cross scanning direction is excessively decreased. When the absolute value in the condition (I) exceeds an upper limit thereof, the field curvature in the cross scanning direction is excessively increased. Accordingly, when the condition (I) is not satisfied, an image forming performance is reduced and the change in diameter of a light spot in the cross scanning direction is greatly changed so that it is difficult to preferably perform an optical scanning operation. In contrast to this, when the condition (I) is satisfied, a function for correcting the field curvature on a concave barrel type toric face constructing the second lens face is preferably fulfilled in the cross scanning direction.

Figure 2:
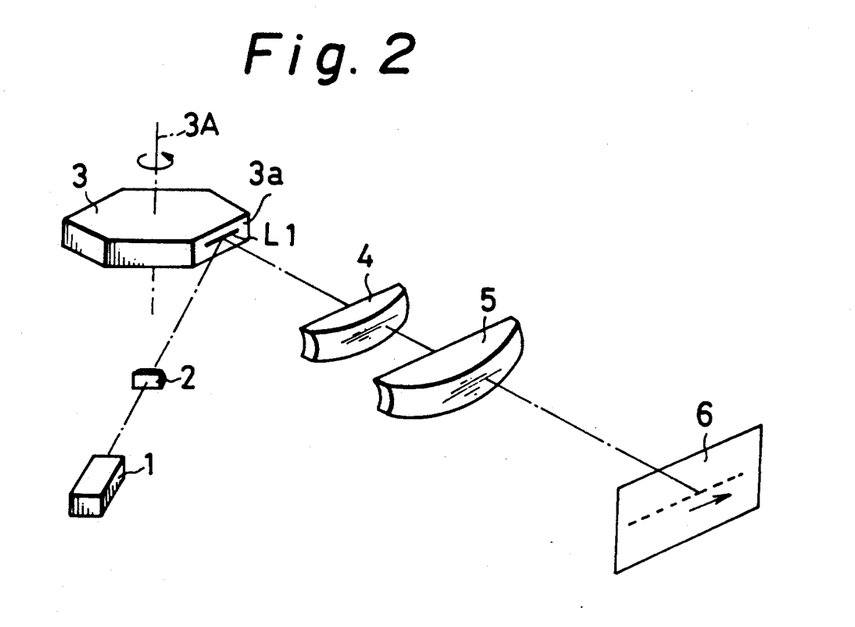
FIGS. 2 to 8 are views and graphs for explaining an optical scanner.
Figure 3:
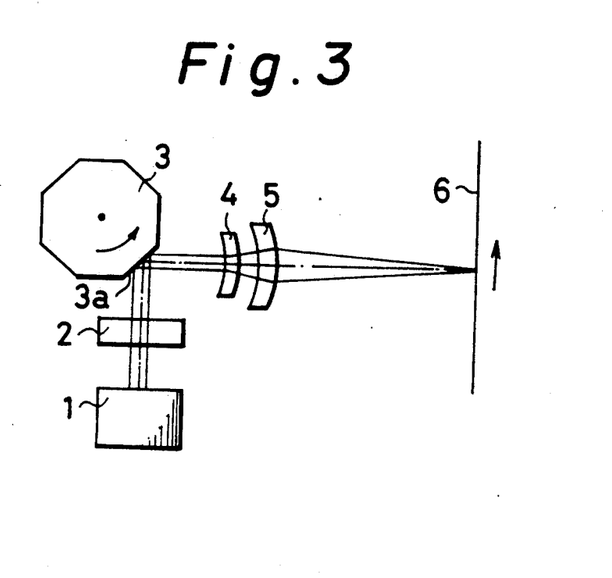

FIG. 2 schematically shows one example of an optical scanner using the f θ lens system. FIG. 3 shows a state in which an optical arrangement shown in FIG. 2 is seen from the cross scanning direction, i.e., the optical arrangement on the deflecting plane.

In FIG. 2, a parallel light beam is emitted from a light source device 1 composed of a light source or the light source and a condenser. This light beam is formed by a cylindrical lens 2 constituting a linear image forming optical system as a linear image LI approximately parallel to the deflecting plane in the vicinity of a reflecting face 3a of a rotary polygon mirror 3. A longitudinal direction of this linear image LI is a main scan-corresponding direction.

The light beam reflected by the rotary polygon mirror 3 is formed by the f θ lens system as an image in the shape of a spot on a scanned face 6. The scanned face 6 is scanned at an equal speed by this light beam in accordance with the rotation of the rotary polygon mirror 3 at an equal speed in the direction shown by an arrow.

The f θ lens system is constructed by a first lens 4 disposed on the side of the rotary polygon mirror 3 and a second lens 5 disposed on the side of the scanned face 6. As shown in FIG. 3, the f θ lens system having the first and second lenses 4 and 5 sets infinity on the side of the light source device 1 and the position of the scanned face 6 in a conjugate relation in geometrical optics on the deflecting plane.

Figure 4:
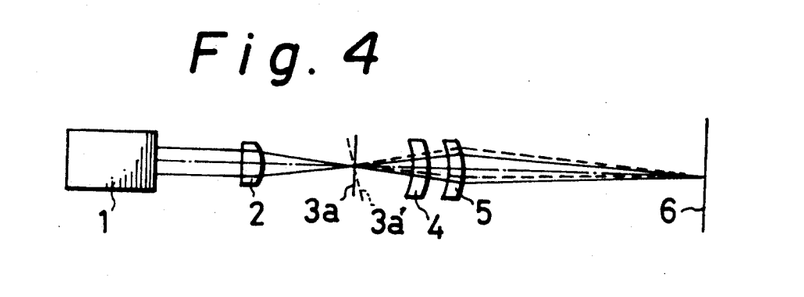

In contrast to this, the f θ lens system sets the reflecting position of the rotary polygon mirror 3 and the scanned face 6 in an approximately conjugate relation in geometrical optics on the deflecting perpendicular plane, i.e., in the cross scanning direction. Accordingly, as shown in FIG. 4, even when the reflecting face $3a$ is inclined as shown by reference numeral $3a'$, the positon of an image formed by the f θ lens system on the scanned face 6 is not almost moved in the cross scanning direction (the vertical direction in FIG. 4) so that the reflecting face inclination is corrected.

Figure 5:
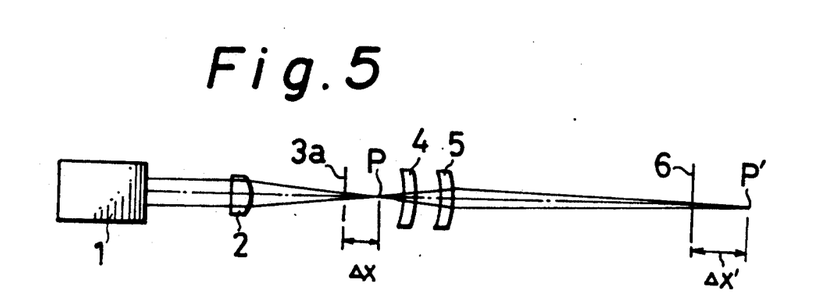

When the rotary polygon mirror 3 is rotated, the reflecting face $3a$ is rotated around an axis 3A. Therefore, as shown in FIG. 5, a shift $\Delta X$ in position is caused between the reflecting face $3a$ and the position P of the formed linear image by the rotation of the reflecting face. Thus, the position P' of a conjugate image of the linear image formed by the f θ lens system is shifted by distance $\Delta X'$ from the scanned face 6. As is well known, this shift amount $\Delta X'$ is provided by $\Delta X' = \beta^2 \Delta X$ when lateral magnification of the f θ lens system in the cross scanning direction is set to $\beta$.

Figure 6:
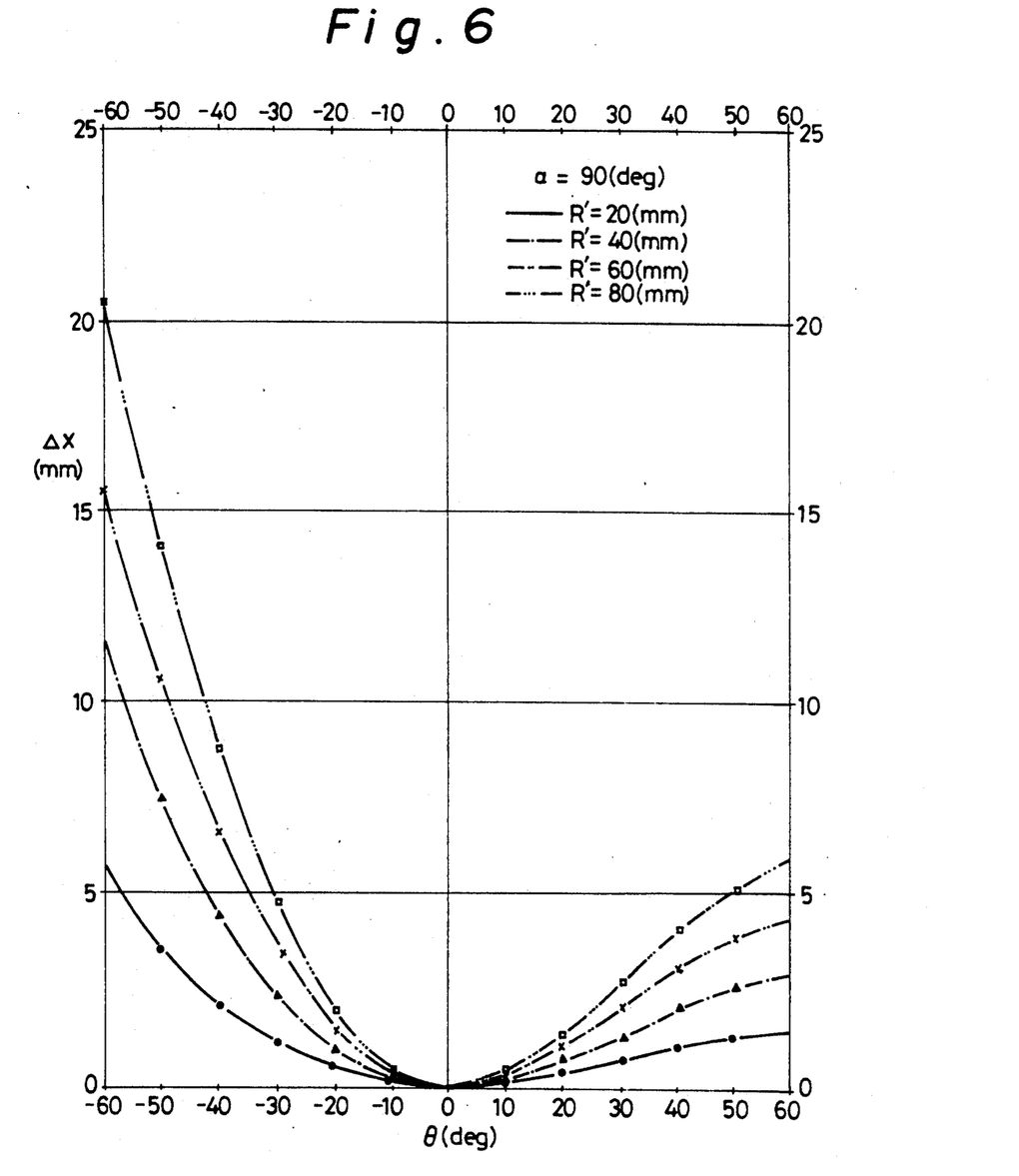
Figure 7:
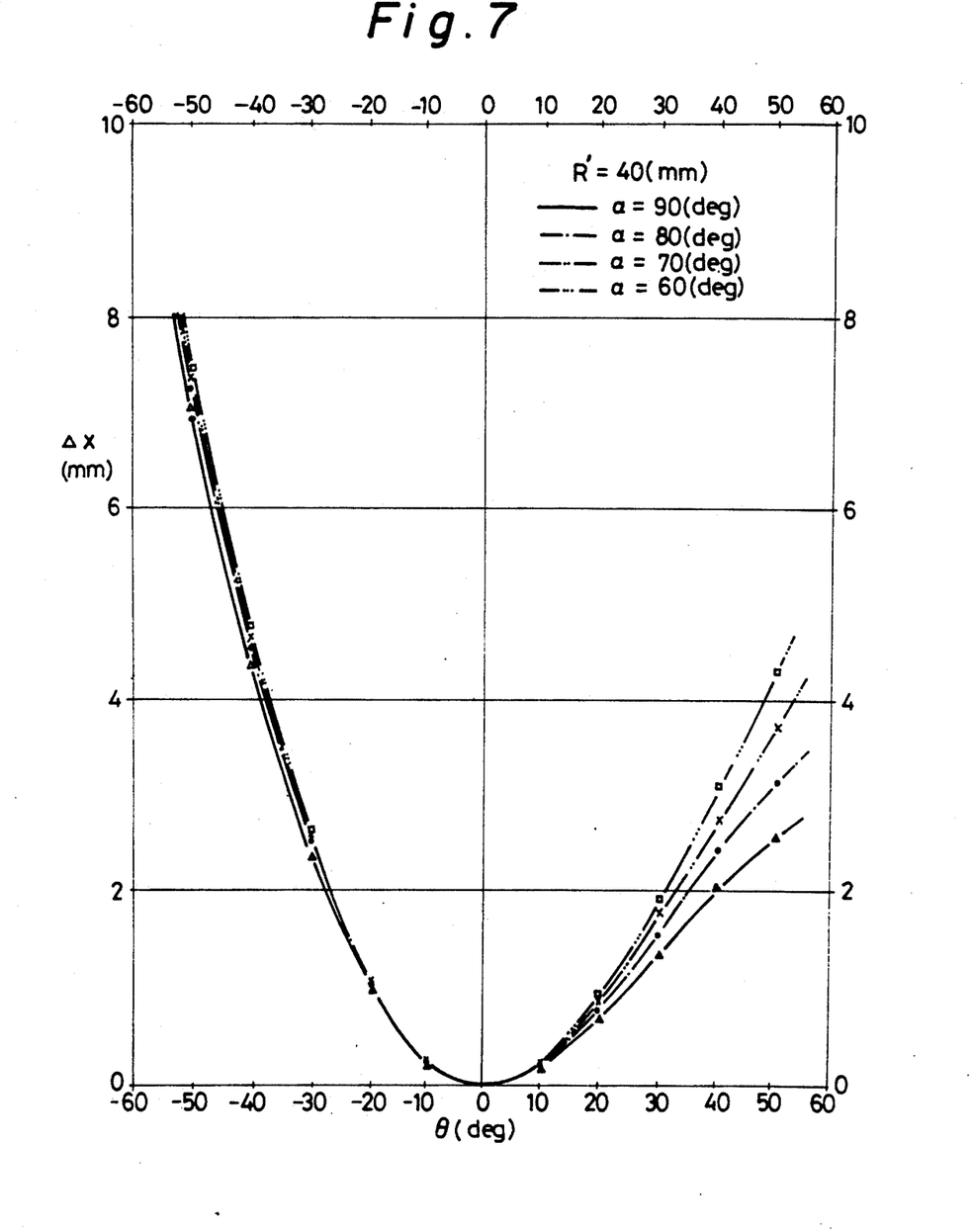

An angle formed between the optical axis of the f θ lens system and a deflected main light beam on the deflecting plane is set to $\theta$. FIGS. 6 and 7 show the relation between the angle $\theta$ and the above position shift $\Delta X$. In FIG. 6, an intrinsic incident angle 60 (see FIG. 8) is set to 90° and the radius R' of an inscribed circle of the rotary polygon mirror 3 is used as a parameter. In FIG. 7, the above radius R' of the inscribed circle is set to 40 mm and the intrinsic incident angle $\alpha$ is used as a parameter. As can be seen from FIGS. 6 and 7, the position shift $\Delta X$ is increased as the radius R' of the inscribed circle is increased and the intrinsic incident angle $\alpha$ is decreased.

The relative shift in position between the reflecting face and the position of the linear image caused by the rotation of the reflecting face is caused two-dimensionally on the deflecting plane and is asymmetrically moved with respect to the optical axis of the lens system. Accordingly, in the optical scanner shown in FIG. 2, it is necessary to preferably correct field curvatures in the main and cross scanning directions of the f θ lens system. The f θ characteristics must be preferably corrected with respect to the main scanning direction.

Figure 8:
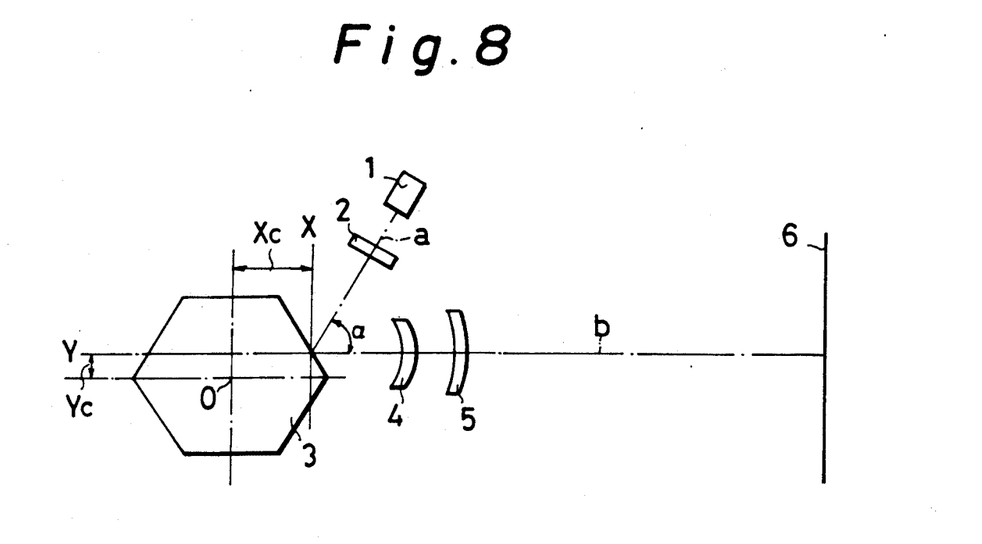

With respect to the above-mentioned intrinsic incident angle $\alpha$, reference numerals a and b in FIG. 8 respectively designate a main light beam incident to the rotary polygon mirror and an optical axis of the f θ lens system. The intrinsic incident angle $\alpha$ is defined as an intersection angle between the main light beam a and the optical axis b as shown in FIG. 8.

X and Y axes are determined as shown in FIG. 8 with the position of an intersection point between the main light beam a and the optical axis b as an origin. The position coordinates of a rotary axis of the rotary polygon mirror 3 are set to Xc and Yc.

As is well known, to reduce the change in position shift $\Delta X$ between the reflecting face and the position of the linear image as much as possible, it is sufficient to set the following conditions, $$0 < Xc < R\cos(\alpha/2)$$

$$0 < Yc < R\sin(\alpha/2)$$

with respect to the position coordinates Xc and Yc where R designates the radius of a circumscribed circle of the rotary polygon mirror.

When the number of reflecting faces of the rotary polygon mirror 3 is set to N and the deflecting angle is set to $\theta$, it is sufficient to set the following condition, $$\theta < \alpha < (4\pi/N) - \theta$$

with respect to the above angle $\alpha$ so as to locate the incident main light beam a outside an effective main scanning region so that no return light from the scanned face 6 is again incident to a main scanning region of the scanned face as ghost light.

A barrel type toric face constructing one feature of the present invention will next be described.

As is well known, a toric face is a face provided by rotating an arc around a straight line which is located on a plane including this arc and does not pass through a center of curvature of the arc.

Figure 9:
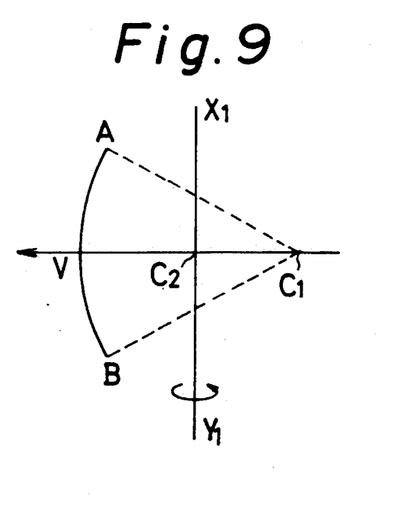
FIGS. 9 and 10 are views for explaining a barrel type toric face.
Figure 10:
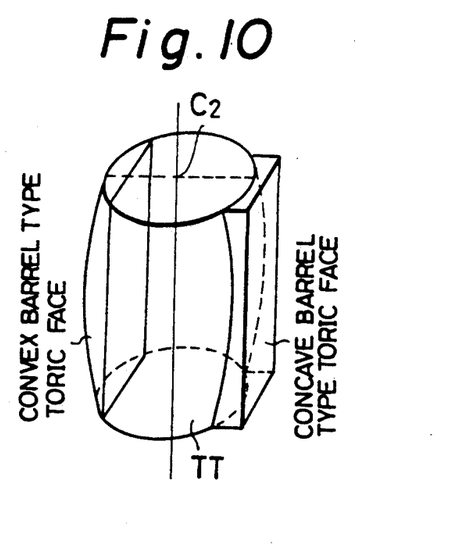
Figures 11A, 11B:
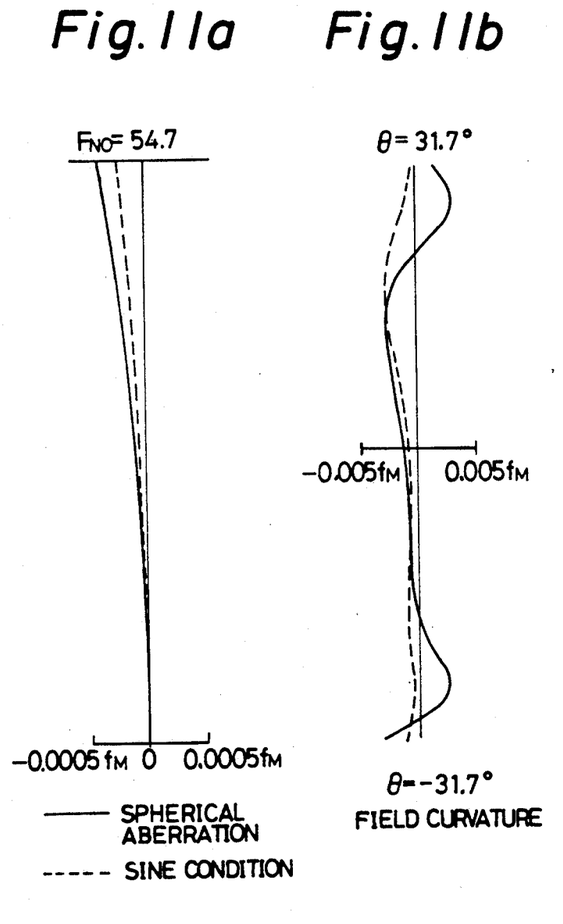
FIGS. 11a–11c, 12a–12c, 13a–13c, 14a–14c, 15a–15c, 16a–16c and 17a–17c diagrams showing field curvature and graphs showing f θ characteristics with respect to respective embodiments of the present invention.
Figure 11C:
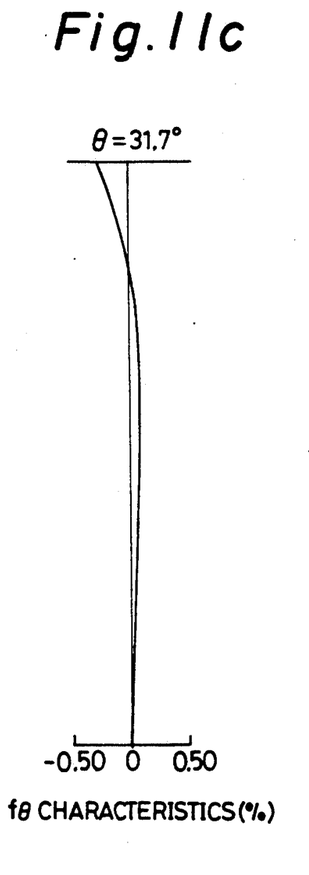
Figure 12A:
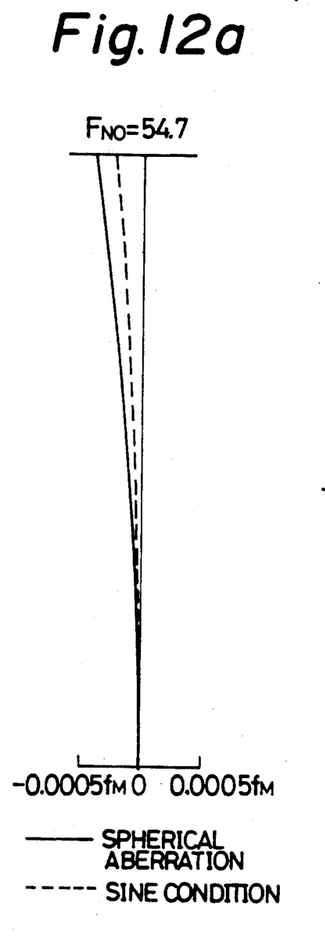
Figure 12B:
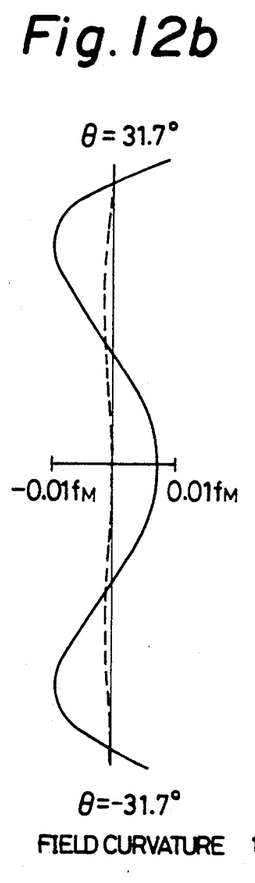
Figure 12C:
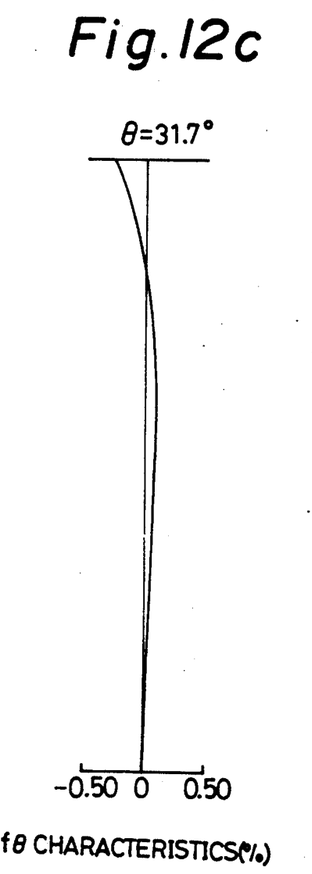
Figure 13A:
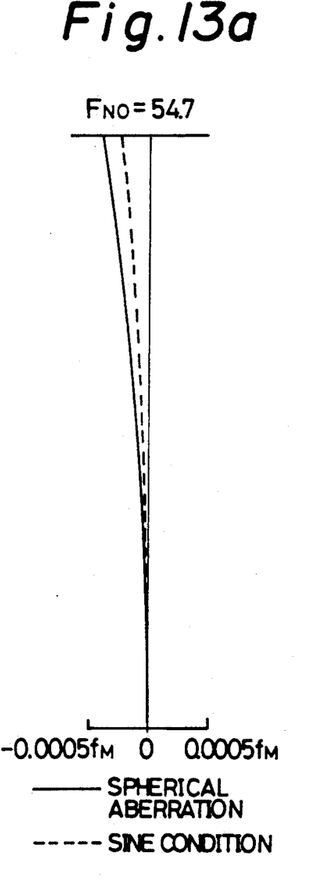
Figure 13B:
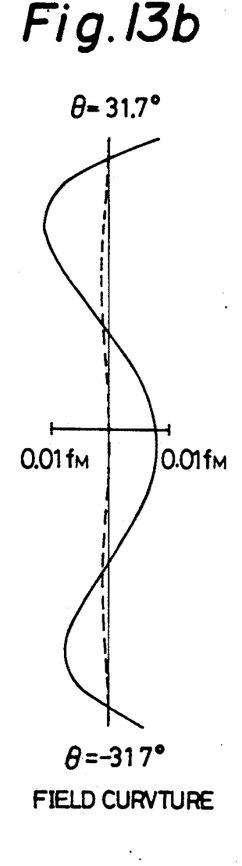
Figure 13C:
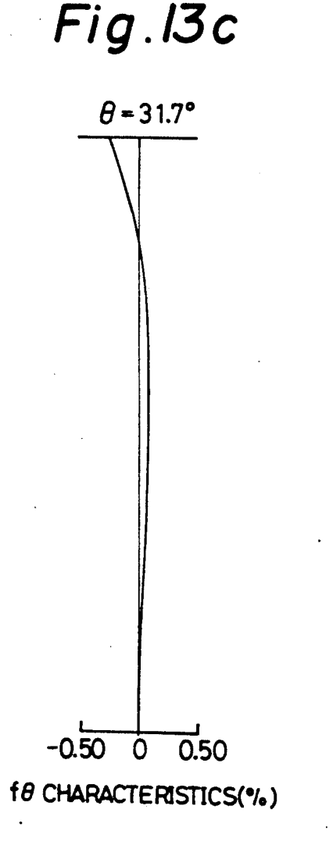
Figure 14A:
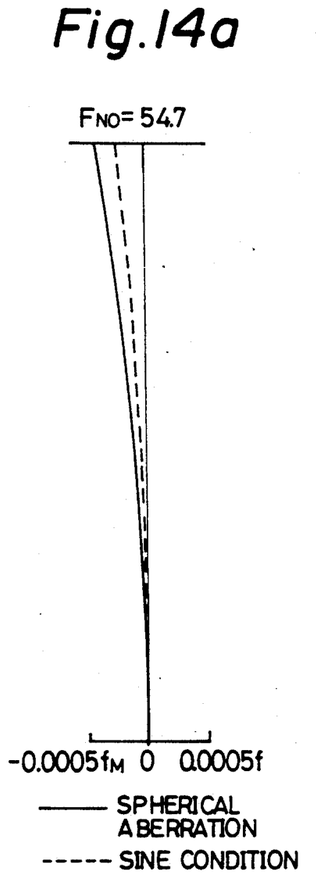
Figure 14B:
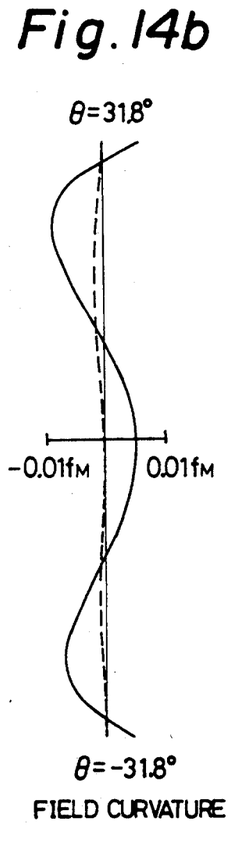
Figure 14C:
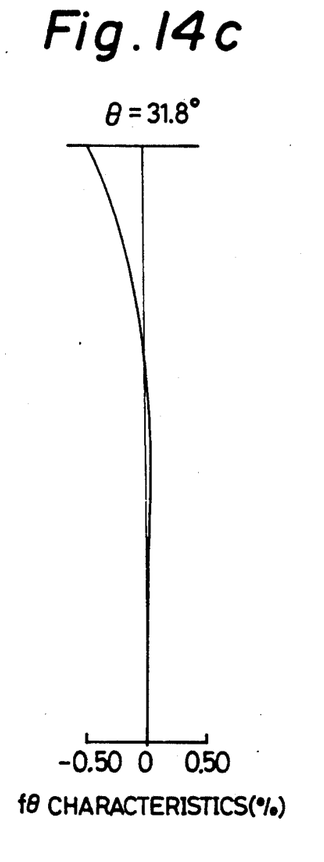
Figure 15A:
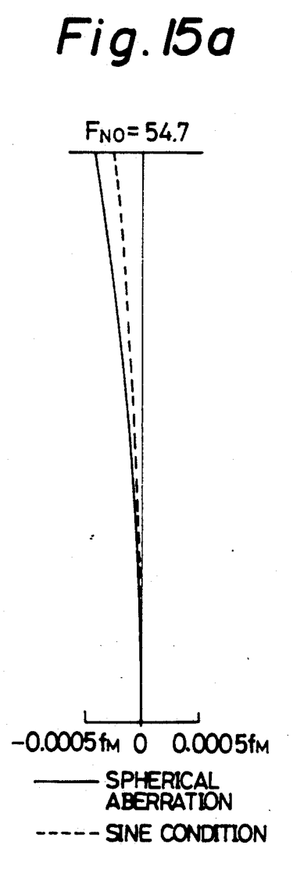
Figure 15B:
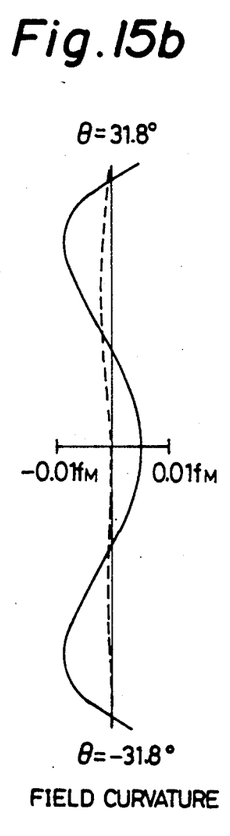
Figure 15C:
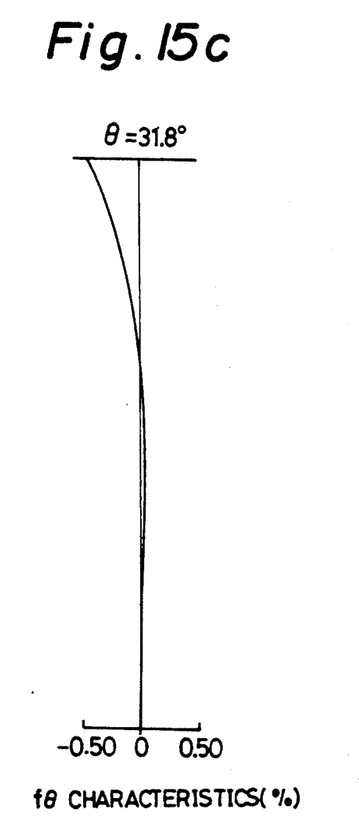
Figure 16A:
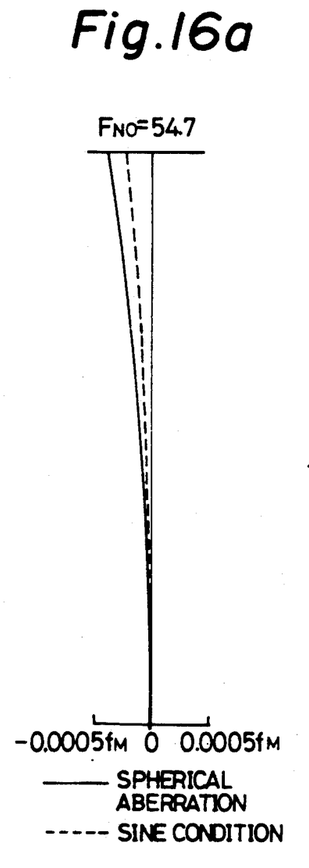
Figure 16B:
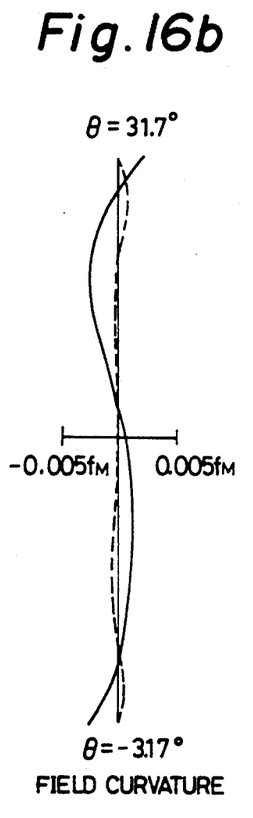
Figure 16C:
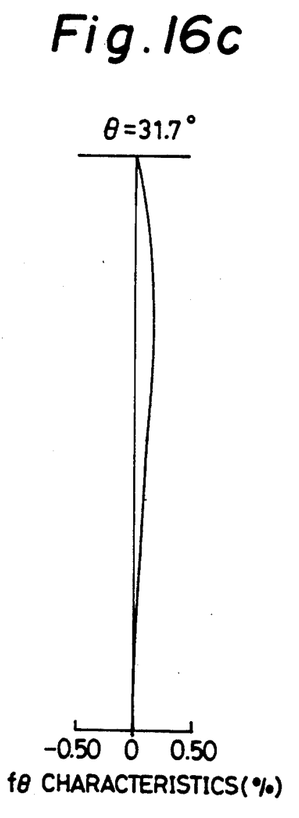
Figure 17A:
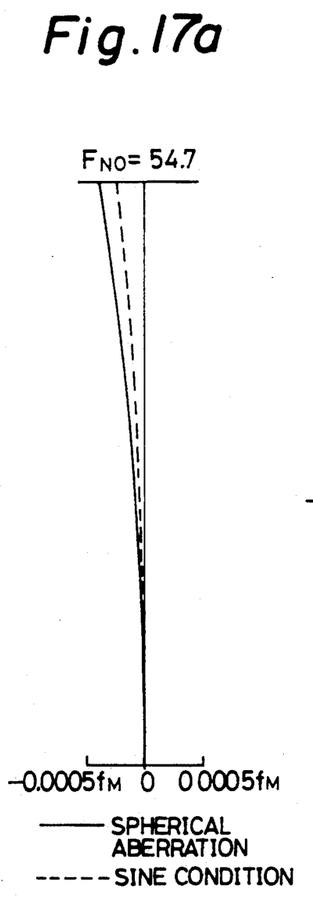
Figure 17B:
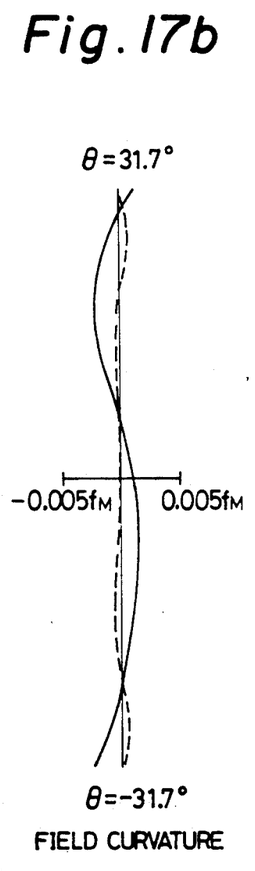
Figure 17C:
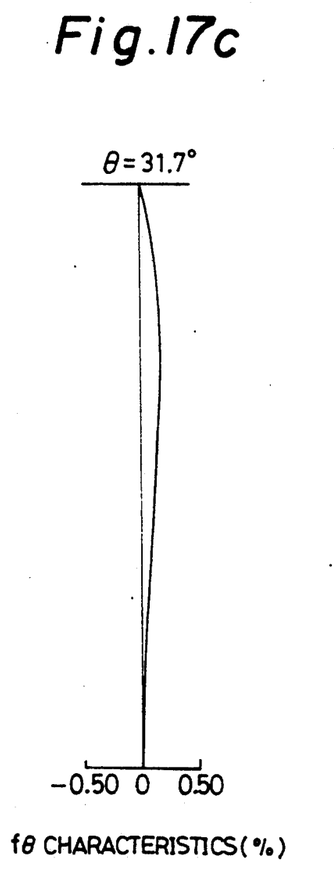

In FIG. 9, a curve passing through points A, V and B is an arc having position $C_1$ as a center of curvature. A barrel type curved surface TT shown in FIG. 10 is obtained by rotating this arc around a straight line $X_1Y_1$ located on the same plane as the arc. This curved surface TT constructs a barrel type toric face. It is possible to use this face TT as a convex or concave lens face. In the present invention, the second lens face is constructed by a concave barrel type toric face.

The arc is located on the deflecting perpendicular plane including the optical axis with respect to a convex toric face constructing the fourth lens face. A rotary axis is parallel to the cross scanning direction on the above deflecting perpendicular plane and is located on a side opposite to the arc with respect to the center of curvature of the arc. Accordingly, the above convex toric face has large curvature on the deflecting perpendicular plane including the optical axis.

The radius of curvature of the barrel type toric face on a plane perpendicular to the $X_1Y_1$ axis is decreased as this toric face is separated from point $C_2$ in the axial direction. This radius of curvature is equal to the distance between the $X_1Y_1$ axis and the arc AVB.

In the present invention, with respect to a concave barrel type toric face constituting the second lens face, the direction of the $X_1Y_1$ axis is set to be parallel to the main scanning direction on the deflecting plane.

The concrete Embodiments 1 to 7 of the present invention will next be described.

In the respective Embodiments, reference numeral $f_M$ designates a combined focal length of the f θ lens system with respect to the main scanning direction, i.e., the combined focal length thereof on a plane parallel to the deflecting plane and is normalized to 100. Reference numeral $f_S$ designates a combined focal length of the lens system on the deflecting perpendicular plane with respect to the cross scanning direction. Reference numerals 2 $\theta$, $\alpha$ and $\beta$ respectively designate a deflection angle (unit: degree), an intrinsic incident angle (unit:

degree) and lateral magnification on the deflecting perpendicular plane.

Reference numeral $r_{iX}$ designates a radius of curvature of an i-th lens face on the deflecting plane counted from the side of the rotary polygon mirror, i.e., the radius of curvature of a lens face shown as "main" in the upper views of FIG. 1. Reference numeral $r_{iY}$ designates a radius of curvature of the i-th lens face on the deflecting perpendicular plane, i.e., the radius of curvature of a lens face shown as "cross" in the lower views of FIG. 1. Reference numerals $r_{1Y}$, $r_{2Y}$, $r_{3Y}$ and $r_{4Y}$ are explained as $r'_1$, $r'_2$, $r'_3$ and $r'_4$ in the above condition (I). With respect to the second lens face, reference numerals $r_{2X}$ and $r_{2Y}$ respectively designate a distance between the points V and $C_1$ in FIG. 9 and a distance between the points V and $C_2$.

Reference numeral $d_i$ designates a distance between the i-th lens faces. Reference numeral $d_0$ designates a distance from a reflecting face of the rotary polygon mirror to the first lens face. Reference numeral $n_j$ designates a refractive index of a j-th lens.

Further, reference numeral K designates the following absolute value, $$|\{(1/r'_1)-(1/r'_2)\}+\{(1/r'_3)-(1/r'_4)\}\cdot f_s|$$

in the above-mentioned condition (I).

EMBODIMENT 1

$f_M=100$, $f_s=23.716$, $\beta=-5.732$, $\alpha=54$, $2\theta=63.5$, $K=3.468$, $d_0=7.816$

| i | $r_{iX}$ | $r_{iY}$ | $d_i$ | j | $n_j$ |
|---|---|---|---|---|---|
| 1 | ∞ | 6.012 | 2.645 | 1 | 1.71221 |
| 2 | 190.636 | 16.174 | 20.563 | | |
| 3 | ∞ | −24.11 | 4.329 | 2 | 1.675 |
| 4 | −53.391 | −12.017 | | | |

EMBODIMENT 2

$f_M=100$, $f_s=23.33$, $\beta=-2.416$, $\alpha=54$, $2\theta=63.5$, $K=0.326$, $d_0=7.816$

| i | $r_{iX}$ | $r_{iY}$ | $d_i$ | j | $n_j$ |
|---|---|---|---|---|---|
| 1 | ∞ | 120.249 | 2.645 | 1 | 1.71221 |
| 2 | 190.636 | 12.025 | 20.563 | | |
| 3 | ∞ | −59.283 | 4.329 | 2 | 1.675 |
| 4 | −53.391 | −12.866 | | | |

EMBODIMENT 3

$f_M=100$, $f_s=6.687$, $\beta=-0.644$, $\alpha=54$, $2\theta=63.5$, $K=5.216$, $d_0=7.816$

| i | $r_{iX}$ | $r_{iY}$ | $d_i$ | j | $n_j$ |
|---|---|---|---|---|---|
| 1 | ∞ | −54.112 | 2.645 | 1 | 1.71221 |
| 2 | 190.636 | 1.202 | 20.563 | | |
| 3 | ∞ | −58.561 | 4.329 | 2 | 1.675 |
| 4 | −53.391 | −11.471 | | | |

EMBODIMENT 4

$f_M=100$, $f_s=16.08$, $\beta=-2.067$, $\alpha=54$, $2\theta=63.7$, $K=1.79$, $d_0=3.607$

| i | $r_{iX}$ | $r_{iY}$ | $d_i$ | j | $n_j$ |
|---|---|---|---|---|---|
| 1 | ∞ | −12.025 | 6.012 | 1 | 1.71221 |
| 2 | 180.374 | 12.025 | 19.48 | | |
| 3 | ∞ | −48.701 | 9.62 | 2 | 1.675 |
| 4 | −53.212 | −13.239 | | | |

EMBODIMENT 5

$f_M=100$, $f_s=54.998$, $\beta=-3.63$, $\alpha=54$, $2\theta=63.7$, $K=7.449$, $d_0=3.607$

| i | $r_{iX}$ | $r_{iY}$ | $d_i$ | j | $n_j$ |
|---|---|---|---|---|---|
| 1 | ∞ | 6.012 | 6.012 | 1 | 1.71221 |
| 2 | 180.374 | 12.025 | 19.48 | | |
| 3 | ∞ | −45.454 | 9.62 | 2 | 1.675 |
| 4 | −53.212 | −13.462 | | | |

EMBODIMENT 6

$f_M 100$, $f_s=74.879$, $\beta=-1.326$, $\alpha=54$, $2\theta=63.4$, $K=43.307$, $d_0=12.025$

| i | $r_{iX}$ | $r_{iY}$ | $d_i$ | j | $n_j$ |
|---|---|---|---|---|---|
| 1 | ∞ | 3.607 | 6.012 | 1 | 1.74405 |
| 2 | 195.345 | 1.082 | 16.691 | | |
| 3 | ∞ | −144.299 | 9.62 | 2 | 1.70217 |
| 4 | −55.176 | −13.268 | | | |

EMBODIMENT 7

$f_M=100$, $f_s=11.524$, $\beta=-0.698$, $\alpha=54$, $2\theta=63.4$, $K=4.212$, $d_0=12.025$

| i | $r_{iX}$ | $r_{iY}$ | $d_i$ | j | $n_j$ |
|---|---|---|---|---|---|
| 1 | ∞ | −60.125 | 6.012 | 1 | 1.74405 |
| 2 | 195.345 | 2.405 | 16.691 | | |
| 3 | ∞ | −129.869 | 9.62 | 2 | 1.70217 |
| 4 | −55.176 | −13.394 | | | |

FIGS. 11a–11c, 12a–12c, 13a–13c, 14a–14c, 15a–15c, 16a–16c and 17a–17c, are respectively diagrams showing aberration and field curvature, and a graph showing the f θ characteristics with respect to the Embodiments 1 to 7. The field curvature is caused by the rotation of the rotary polygon mirror, and broken and solid lines respectively show field curvatures with respect to the main and cross scanning directions.

The f θ characteristics are defined by $$(h-f_M\theta)\cdot 100/(f_M\theta)$$

when the height of an ideal image is set to $f_M\theta$ and the height of the real image is set to h.

In the respective Embodiments, aberration is preferable and field curvature is especially corrected preferably in the main and cross scanning directions. Further, the f θ characteristics are also preferable.

As mentioned above, in the above-mentioned f θ lens system in accordance with the present invention, field curvatures in the main and cross scanning directions are preferably corrected while the inclination of a reflecting face of the rotary polygon mirror is preferably corrected, thereby performing an optical scanning operation of high density.

Many widely different embodiments of the present invention may be constructed without departing from the spirit and scope of the present invention. It should be understood that the present invention is not limited to the specific embodiments described in the specification, except as defined in the appended claims.

What is claimed is:

1. An fθ lens system in an optical scanner in which an approximately parallel light beam from a light source device is formed as a linear image extending in a main scanning direction and is deflected at an equal angular velocity by a rotary polygon mirror having a reflecting face in the vicinity of the position of the formed linear image and the deflected light beam is formed by an image forming lens system as an image in the shape of a spot on a scanned face to optically scan the scanned face at an approximately equal speed, said image forming lens system forming the light beam deflected by the rotary polygon mirror as an image on the scanned face, said fθ lens system having a function for setting a reflecting point on said reflecting face of the rotary polygon mirror and an image point on the scanned face in an approximately conjugate relation in geometrical optics with respect to a cross scanning direction, and having an fθ function with respect to said main scanning direction, said fθ lens system comprising two groups of first and second lenses sequentially arranged from the side of the rotary polygon mirror toward the scanned face side, a deflecting plane being constructed by a plane provided by moving a main light beam ideally deflected by the rotary polygon mirror in accordance with the deflection of the main light beam, a deflecting perpendicular plane being constructed by a plane parallel to an optical axis of said image forming lens system and perpendicular to said deflecting plane, said lenses having first to fourth lens faces which are counted from the side of said rotary polygon mirror and respectively have shapes of a straight line, an arc, a straight line and an arc on the deflecting plane sequentially from the first lens face toward the fourth lens face, said first and second lenses respectively having negative and positive refracting powers on a plane parallel to the deflecting plane, said first lens face being constructed by a convex or concave cylindrical face having refracting power only on the deflecting perpendicular plane, said second lens face being constructed by a concave barrel type toric face having a radius of curvature on the deflecting perpendicular plane decreased as this toric face is separated from the optical axis, said third lens face being constructed by a concave cylindrical face having refracting power only on the deflecting perpendicular plane, said fourth lens face being constructed by a convex toric face having large curvature on the deflecting perpendicular plane.

2. An fθ lens system as claimed in claim 1, wherein a combined focal length $f_S$ of the lens system on the deflecting perpendicular plane and radii $r'_1$, $r'_2$, $r'_3$ and $r'_4$ of curvature of the first to fourth lens faces on the deflecting perpendicular plane including the optical axis satisfy the following condition, $$0.3 < |\{(1/r'_1)-(1/r'_2)\}+\{(1/r'_3)-(1/r'_4)\}\cdot f_s| < 44.$$

3. An fθ lens system as claimed in claim 1, wherein said deflecting plane corresponds to the main scanning direction.

4. An fθ lens system as claimed in claim 3, wherein said deflecting perpendicular plane corresponds to the cross scanning direction.

5. An fθ lens system in an optical scanner in which an approximately parallel light beam from a light source device is formed as a linear image extending in a main scanning direction and is deflected at an equal angular velocity by a rotary polygon mirror having a reflecting face in the vicinity of the position of the formed linear image and the deflected light beam is formed by an image forming lens system as an image in the shape of a spot on a scanned face to optically scan the scanned face at an approximately equal speed, said image forming lens system forming the light beam deflected by the rotary polygon mirror as an image on the scanned face, said fθ lens system having a function for setting a reflecting point on said reflecting face of the rotary polygon mirror and an image point on the scanned face in an approximately conjugate relation in geometrical optics with respect to a cross scanning direction, and having an fθ function with respect to said main scanning direction.

said fθ lens system comprising two groups of first and second lenses sequentially arranged from the side of the rotary polygon mirror toward the scanned face side, a deflecting plane being constructed by a plane provided by moving a main light beam ideally deflected by the rotary polygon mirror in accordance with the deflection of the main light beam, a deflecting perpendicular plane being constructed by a plane parallel to an optical axis of said image forming lens system and perpendicular to said deflecting plane, said lenses having first to fourth lens faces which are counted from the side of said rotary polygon mirror and respectively have shapes of a straight line, an arc, a straight line and an arc on the deflecting plane sequentially from the first lens face toward the fourth lens face, said first and second lenses respectively having negative and positive refracting powers on a plane parallel to the deflecting plane, said first lens face being constructed by a convex or concave cylindrical face having refracting power only on the deflecting perpendicular plane, said second lens face being constructed by a concave barrel type toric face having a radius of curvature on the deflecting perpendicular plane decreased as this toric face is separated from the optical axis, said third lens face being constructed by a concave cylindrical face having refracting power only on the deflecting perpendicular plane, said fourth lens face being constructed by a convex toric face having large curvature on the deflecting perpendicular plane, a combined focal length $f_s$ of the lens system on the deflecting perpendicular plane and radii $r'_1$, $r'_2$, $r'_3$ and $r'_4$ of curvature of the first to fourth lens faces on the deflecting perpendicular plane including the optical axis satisfying the following condition, $$0.3 < |\{(1/r'_1)-(1/r'_2)\}+\{(1/r'_3)-(1/r'_4)\}\cdot f_s| < 44.$$

6. An f θ lens system as claimed in claim 5, wherein said deflecting plane corresponds to the main scanning direction.

7. An f θ lens system as claimed in claim 6, wherein said deflecting perpendicular plane corresponds to the cross scanning direction.

8. An f θ lens system as claimed in claim 5, wherein said condition is satisfied to correct field curvature in the cross scanning direction.

* * * * *